(12) United States Patent
Jeong et al.

(10) Patent No.: US 9,789,444 B2
(45) Date of Patent: Oct. 17, 2017

(54) METHODS TO ENHANCE SEPARATION PERFORMANCE OF METAL-ORGANIC FRAMEWORK MEMBRANES

(71) Applicant: The Texas A&M University System, College Station, TX (US)

(72) Inventors: Hae-Kwon Jeong, College Station, TX (US); Hyuk Taek Kwon, College Station, TX (US)

(73) Assignee: The Texas A&M University System, College Station, TX (US)

( * ) Notice: Subject to any disclaimer, the term of this patent is extended or adjusted under 35 U.S.C. 154(b) by 321 days.

(21) Appl. No.: 14/637,088

(22) Filed: Mar. 3, 2015

(65) Prior Publication Data

US 2015/0251139 A1    Sep. 10, 2015

Related U.S. Application Data

(60) Provisional application No. 61/947,923, filed on Mar. 4, 2014.

(51) Int. Cl.
| | |
|---|---|
| *B01D 53/22* | (2006.01) |
| *B01D 71/02* | (2006.01) |
| *B01D 69/12* | (2006.01) |
| *B01D 69/02* | (2006.01) |

(52) U.S. Cl.
CPC ......... *B01D 71/022* (2013.01); *B01D 53/228* (2013.01); *B01D 69/12* (2013.01); *B01D 69/02* (2013.01); *B01D 2325/02* (2013.01)

(58) Field of Classification Search
CPC .............. B01D 2325/02; B01D 53/228; B01D 71/022; B01D 69/12; B01D 69/02
See application file for complete search history.

(56) References Cited

U.S. PATENT DOCUMENTS

| | | | | |
|---|---|---|---|---|
| 7,637,983 B1* | 12/2009 | Liu | ...................... | B01D 53/228 210/500.21 |
| 8,673,057 B2* | 3/2014 | Zhou | .................... | B01D 53/228 423/702 |
| 9,192,913 B2* | 11/2015 | Inubushi | ................ | B01D 53/02 |
| 2007/0202038 A1* | 8/2007 | Yaghi | ..................... | B01J 20/226 423/702 |
| 2009/0131242 A1* | 5/2009 | Liu | ...................... | B01D 53/228 502/4 |
| 2009/0131643 A1* | 5/2009 | Ni | ............................ | C01G 9/00 534/16 |
| 2009/0169857 A1* | 7/2009 | Fischer | .................. | B01J 20/226 428/304.4 |

(Continued)

Primary Examiner — Anthony Shumate
(74) Attorney, Agent, or Firm — Tumey L.L.P.

(57) ABSTRACT

A method produces a metal-organic framework on a surface of another metal-organic framework. One embodiment comprises contacting the first metal-organic framework with a ligand and solvent solution; wherein the first metal-organic framework comprises a first ligand and a first metal; wherein the ligand and solvent solution comprises a second ligand that is different from the first ligand in the first metal-organic framework; and allowing the second ligand from the ligand and solvent solution to exchange with the first ligand present in the first metal-organic framework for a period of time suitable to produce the second metal-organic framework on the surface of the first metal-organic framework.

7 Claims, 2 Drawing Sheets

(56) References Cited

U.S. PATENT DOCUMENTS

| | | | | |
|---|---|---|---|---|
| 2010/0075123 A1* | 3/2010 | Masel | C07C 51/412 | 428/219 |
| 2010/0132547 A1* | 6/2010 | Masel | B01D 15/00 | 95/90 |
| 2010/0226991 A1* | 9/2010 | Horcajada-Cortes | C07F 15/025 | 424/489 |
| 2011/0138999 A1* | 6/2011 | Willis | B01D 53/228 | 95/45 |
| 2011/0172412 A1* | 7/2011 | Serre | C07C 7/13 | 540/145 |
| 2012/0077667 A1* | 3/2012 | Liu | H01M 4/8605 | 502/101 |
| 2012/0247328 A1* | 10/2012 | Brown | B01D 53/228 | 95/51 |
| 2012/0297982 A1* | 11/2012 | Dinca | B01D 53/228 | 96/4 |
| 2013/0096210 A1* | 4/2013 | Yaghi | A61K 47/24 | 514/784 |
| 2013/0204025 A1* | 8/2013 | Buso | C07F 3/003 | 556/130 |
| 2013/0273461 A1* | 10/2013 | Liu | H01M 4/9008 | 429/535 |
| 2013/0313193 A1* | 11/2013 | Nair | B01D 53/228 | 210/650 |
| 2013/0330658 A1* | 12/2013 | Palmqvist | B01J 31/1625 | 429/532 |
| 2014/0319058 A1* | 10/2014 | Taylor-Pashow | G21F 9/12 | 210/660 |
| 2014/0330020 A1* | 11/2014 | Banerjee | C07F 3/06 | 546/12 |
| 2015/0180045 A1* | 6/2015 | Liu | H01M 4/9008 | 429/527 |
| 2015/0273401 A1* | 10/2015 | Miller | B01D 67/0037 | 210/500.25 |

* cited by examiner

US 9,789,444 B2

METHODS TO ENHANCE SEPARATION PERFORMANCE OF METAL-ORGANIC FRAMEWORK MEMBRANES

CROSS-REFERENCE TO RELATED APPLICATIONS

This application claims priority to U.S. Application Ser. No. 61/947,923 filed on Mar. 4, 2014, the disclosure of which is herein incorporated by reference in its entirety.

STATEMENT REGARDING FEDERALLY SPONSORED RESEARCH OR DEVELOPMENT

This invention was made with government support under grant number CBET-1132157 awarded by the NSF. The government has certain rights in the invention.

BACKGROUND OF THE INVENTION

Field of the Invention

This invention relates to the field of gas separation and more specifically to the construction of ultra-thin metal-organic frameworks (MOF), for example zeolitic-imidazolate frameworks (ZIF), for use as gas separation membranes prepared by methods of counter diffusion and ligand/metal exchange.

Background of the Invention

Metal-organic frameworks such as zeolitic-imidazolate frameworks, are a class of organic-inorganic hybrid materials. The metal-organic frameworks are typically crystalline and have metal centers coordinated to organic linkers. Metal-organic frameworks have been found useful for gas separation such as gas separation membrane applications.

Energy efficient membrane-based gas separations are attractive alternatives to conventional separation technologies such as distillation. Despite the great potential of polycrystalline framework membranes (such as MOF membranes) for energy efficient gas separations, the prohibitively high cost of these membranes and processes hampered their practical applications. Amongst other reasons, the high cost may be due to a lack of commercially-viable manufacturing processes and the unsatisfactory membrane performance (e.g., insufficient productivity and selectivity). For membrane applications, metal-organic framework materials are in the form of films on porous supports. Polycrystalline metal-organic framework membranes are made by several different methods. As discussed above, such methods may have drawbacks for industrial applications including the high cost of membranes and membrane production processes as compared to alternatives such as polymeric membranes.

Consequently, there is a need for improved synthesis methods for making membranes and films of metal-organic frameworks that address all of the drawbacks described above.

BRIEF SUMMARY OF SOME OF THE PREFERRED EMBODIMENTS

These and other needs in the art are addressed in an embodiment comprising a method for producing a second metal-organic framework on a surface of a first metal-organic framework. The method comprises contacting the first metal-organic framework with a ligand and solvent solution; wherein the first metal-organic framework comprises a first ligand and a first metal; wherein the ligand and solvent solution comprises a second ligand that is different from the first ligand in the first metal-organic framework; and allowing the second ligand from the ligand and solvent solution to exchange with the first ligand present in the first metal-organic framework for a period of time suitable to produce the second metal-organic framework on the surface of the first metal-organic framework.

These and other needs in the art are addressed in a further embodiment comprising a method for producing a second metal-organic framework on a surface of a first metal-organic framework. The method comprises contacting the first metal-organic framework with a metal and solvent solution; wherein the first metal-organic framework comprises a first ligand and a first metal; wherein the ligand and solvent solution comprises a second metal that is different from the first metal in the first metal-organic framework; and allowing the second metal from the metal and solvent solution to exchange with the first metal present in the first metal-organic framework for a period of time suitable to produce the second metal-organic framework on the surface of the first metal-organic framework.

These and other needs in the art are addressed in an additional embodiment comprising a membrane. The membrane comprises a support, a first metal-organic framework comprising a first ligand and a first metal, and a second metal-organic framework formed on the first metal-organic framework; wherein the second-metal organic framework comprises a second ligand and a second metal.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

These drawings illustrate certain aspects of some of the embodiments of the present method, and should not be used to limit or define the method.

DETAILED DESCRIPTION OF THE PREFERRED EMBODIMENTS

Figure 1:
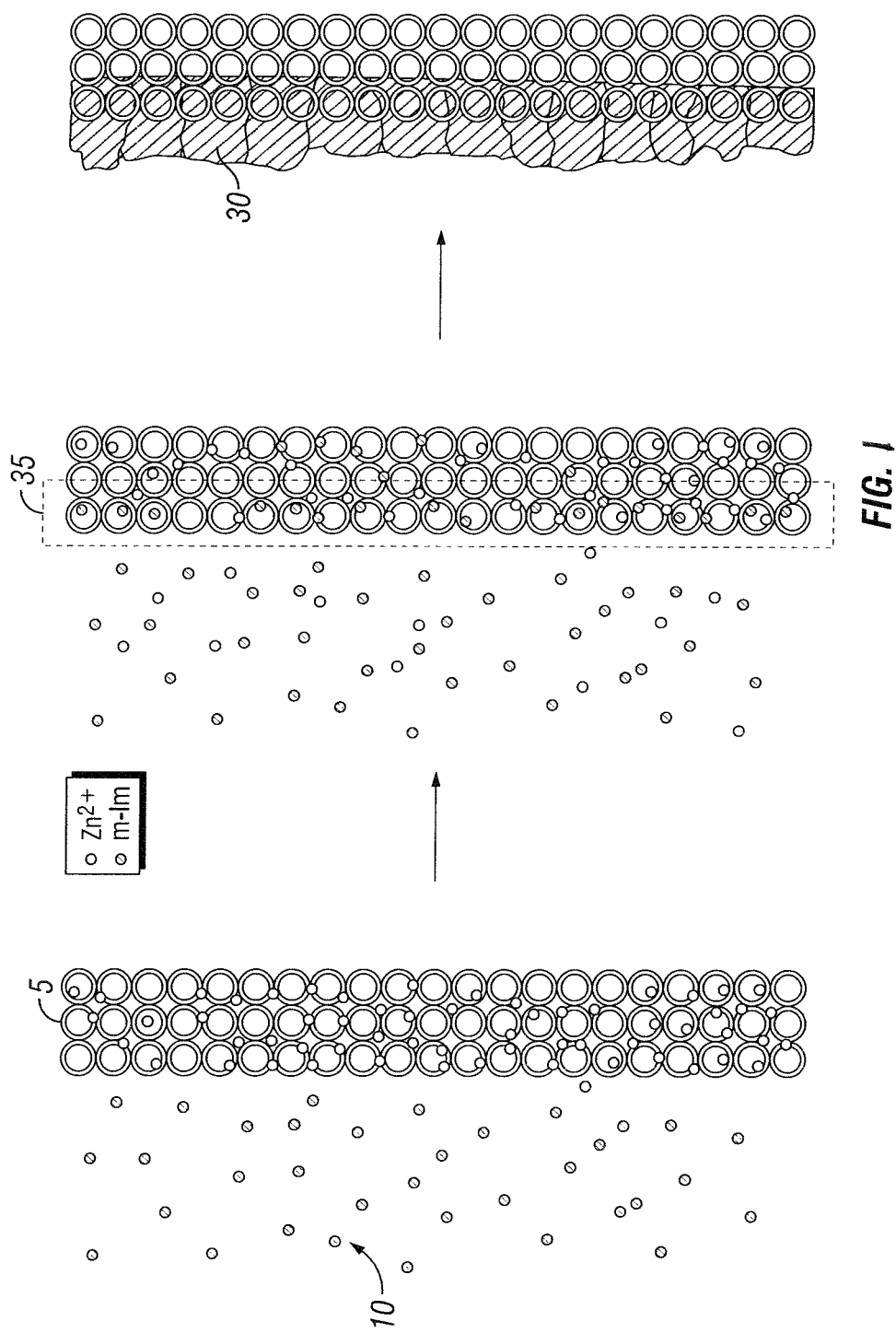
FIG. 1 illustrates a counter-diffusion method in accordance with certain embodiments.

In embodiments, an ultra-thin "second" MOF membrane is created through a controlled ligand and/or metal exchange process on the surface of a "first" MOF membrane attached to a support. As used herein, the term "first" refers to a prior existing MOF membrane, relative to the point of formation of the "second" MOF membrane, which may be used in a ligand and/or metal exchange reaction to form the "second" MOF membrane on its surface. As used herein, the term "second" refers to a MOF membrane created on the surface of a prior existing "first" MOF membrane. In embodiments, the first step of the technique is to create the first MOF membrane on a support. The first MOF may be constructed on a support using a counter-diffusion method described below. Generally, the construction of the first MOF comprises contacting the support with a first solution and a second solution. In embodiments, the support may be soaked with the first solution. The support may be contacted with the first solution by any suitable method. Without limitation, examples of suitable methods include spray, bath, submersion, slip, drop (i.e., dropping the first solution on the support), spray coating, tape casting, slip coating, and the like. The first solution may include any solution suitable for foaming a desired metal-organic framework. In embodiments, the first solution may include a metal and a solvent or a ligand and a solvent. In embodiments, the support may then be contacted with a second solution. The support may be contacted with the second solution by any suitable method. Without limitation, examples of suitable methods include spray, bath, submersion, slip, drop (i.e., dropping the first solution on the support), spray coating, tape casting, slip coating, and the like. The second solution may include any solution suitable for forming a desired metal-organic framework. In embodiments, the second solution may include a metal and a solvent or a ligand and a solvent.

In embodiments, the order in which the solutions are applied is immaterial. The metal and solvent solution may be applied first, or the ligand and solvent solution may be applied first. In embodiments, the construction of the first MOF is dependent on the support being contacted by both the metal and the ligand. Therefore, it is to be understood that unless explicitly stated by an embodiment, the order of solutions applied to the support may be interchanged such that the solution order may be reversed before contact with the support.

In embodiments, the first solution or the second solution may be a metal and solvent solution. The metal and solvent solution comprises a metal. Without limitation, examples of suitable metals may include, but are not limited to iron, copper, zinc, cobalt, aluminum, zirconium, vanadium, chromium, manganese, the like, or any combinations thereof. The metal may be any suitable metal for the desired metal-organic framework. Metals may be applied in combinations or may be present as a combination in the metal and solvent solution. The metals may be provided by any suitable metal source such as salts, (e.g.; nitrates, chlorides, acetates, etc.). For instance, an example of a suitable copper source is copper nitrate hemi(pentahydrate), and an example of a suitable zinc source is zinc acetate dihydrate. In embodiments, the metals may be present in the metal and solvent solution in a range of about 0.01% to about 5%; alternatively about 5% to about 10%; or alternatively about 10% to about 20% by weight of the solution. With the benefit of this disclosure, one of ordinary skill in the art will be able to select a metal for a desired application.

In embodiments, the first solution or the second solution may be a ligand and solvent solution. The ligand and solvent solution comprises a ligand. Any suitable ligand may be used. Without limitation, examples of suitable ligands include imidazoles and derivatives such as 2-methylimidazole, benzimidazole, nitroimidazole, chloroimidazole, and the like; and carboxylic acids and derivatives such as 1,4-benzenedicarboxylic acid, 1, 3, 5-benzene tricarboxylic acid, imidazole carboxaldehyde, the like, or any combinations thereof. The ligand may be any suitable ligand for the desired ligand-inorganic framework. Ligands may be applied in combinations or may be present as a combination in the ligand and solvent solution. As discussed below, the ligand may also undergo post-synthetic modification. In embodiments the ligands may be present in the ligand and solvent solution in a range of about 0.01% to about 20%; alternatively about 20% to about 40%; or alternatively about 40% to about 60% by weight of the solution. With the benefit of this disclosure, one of ordinary skill in the art will be able to select a ligand for a desired application.

Any suitable solvent may be used for the metal and solvent solution and the ligand and solvent solution. In embodiments, the solvents are any organic solvents suitable for metal-organic framework synthesis. Without limitation, examples of suitable solvents are alcohols (i.e., methanol, ethanol, and the like), water, dimethylformamide, dimethyl sulfoxide, or any combinations thereof. The choice of solvent is dependent upon the desired application conditions. Solvents may be chosen to control the vapor pressure, evaporation rate, etc. Additionally, solvents may be used in combination to control the vapor pressure, evaporation rate, etc. The solvent may be present in the metal and solvent solution in a range of about 10% to about 50%; alternatively about 50% to about 70%; or alternatively about 70% to about 90% by weight of the solution. The solvent may be present in the ligand and solvent solution in a range of about 10% to about 50%; alternatively about 50% to about 70%; or alternatively about 70% to about 90% by weight of the solution. With the benefit of this disclosure, one of ordinary skill in the art will be able to select a solvent for a desired application.

In some embodiments, a catalyst such as a deprotonator is also dissolved in the metal and/or ligand solutions. Any catalyst suitable for the metal-organic framework may be used. Without limitation, examples of catalysts are deprotonators such as sodium formate; organic bases such as ethylamine, diethylamine, and the like; inorganic bases such as sodium hydroxide, potassium hydroxide, and the like; or any combinations thereof. The catalyst may be added to the metal and solvent solution and/or the ligand and solvent solution. Amongst other reasons, the catalyst may be used to increase the reaction rate to insure that a sufficient membrane develops prior to the reactants diffusing or the solvent evaporating. The catalyst may be present in the metal and solvent solution in a range of about 0% to about 10%; alternatively about 10% to about 20%; or alternatively about 20% to about 30% by weight of the solution. The catalyst may be present in the ligand and solvent solution in a range of about 0% to about 10%; alternatively about 10% to about 20%; or alternatively about 20% to about 30% by weight of the solution. With the benefit of this disclosure, one of ordinary skill in the art will be able to select a catalyst for a desired application.

In embodiments, the first MOF comprises the metal and the ligand from the metal and solvent solution and the ligand and solvent solution. In embodiments, the molar ratio of the metal:ligand:catalyst:solvent solution is about 1:X:Y:Z; where the ligand is represented by X and for every 1 mole of metal is present in an amount of about 0.1 mole to about 100 moles; where the catalyst is represented by Y and for every 1 mole of metal is present in an amount of about 0 moles to about 100 moles; and where the combined solvent amount (i.e. the total amount of solvent of both the metal and solvent solution and the ligand and solvent solution) is represented by Z and for every 1 mole of metal is present in an amount of about 10 moles to about 1000 moles. In some embodiments, the metal:catalyst:solvent solution is about 1:Y:Z; where the catalyst is represented by Y and for every 1 mole of metal is present in an amount of about 0 moles to about 100 moles; and where the solvent is represented by Z and for every 1 mole of metal is present in an amount of about 10 moles to about 1000 moles. In an embodiment, the ligand:catalyst:solvent solution is about 1:Y:Z; where the catalyst is represented by Y and for every 1 mole of ligand is present in an amount of about 0 moles to about 100 moles; and where the solvent is represented by Z and for every 1 mole of ligand is present in an amount of about 10 moles to about 1000 moles. With the benefit of this disclosure, one of ordinary skill in the art will be able to choose an appropriate molar ratio of components for a desired application.

In embodiments, the support may be any support (i.e., substrate) that is suitable for membrane-based separations. In an embodiment, the support is porous for it to be suitable. In embodiments, the support may comprise ceramics, polymers, stainless steel, and the like, or any combinations thereof. The support may comprise any shape such as discs, hollow fibers, cylinders, sheets, tubes, tubules, tubulars, and the like. It is to be understood that the shape and materials used for the support are not dependent upon one another, and a support of any shape may comprise any material. With the benefit of this disclosure, one of ordinary skill in the art will be able to select a support for a desired application.

In embodiments, the supports comprise pores. The pores may be coated with the first solution of either a ligand or metal before application of the second solution of either a ligand or metal. In embodiments, the pores in the support are sufficiently sized for the formation of crystals. In embodiments, the pores are from about 200 nm to about 1 micron, alternatively from about 200 nm to about 500 nm, and alternatively from about 20 nm to about 200 nm. With the benefit of this disclosure, one of ordinary skill in the art will be able to choose a support with a suitable pore size for a desired application.

Embodiments comprise a MOF. Examples of MOFs include, ZIF-7 (Zeolitic Imidazolate Framework number 7), ZIF-8 (Zeolitic Imidazolate Framework number 8), ZIF-9 (Zeolitic Imidazolate Framework number 9), ZIF-11 (Zeolitic Imidazolate Framework number 11), ZIF-12 (Zeolitic Imidazolate Framework number 12), ZIF-21 (Zeolitic Imidazolate Framework number 21), ZIF-65 (Zeolitic Imidazolate Framework number 65), ZIF-67 (Zeolitic Imidazolate Framework number 67), ZIF-71 (Zeolitic Imidazolate Framework number 71), ZIF-76 (Zeolitic Imidazolate Framework number 76), ZIF-90 (Zeolitic Imidazolate Framework number 90), ZIF-91 (Zeolitic Imidazolate Framework number 91), HKUST-1 (Hong Kong University of Science & Technology number 1), IRMOF-1 (Isoreticular Metal-Organic Framework number 1), IRMOF-3 (Isoreticular Metal-Organic Framework number 3), MIL-101 (Materials for Institut Lavoisier number 101), UIO-66 (University of Oslo number 66), and the like, or any combinations thereof. Any MOF capable of being synthesized is suitable for embodiments. Also any MOF capable of being isostructrual with another MOF is also suitable for embodiments. With the benefit of this disclosure, one of ordinary skill in the art will be able to construct a MOF membrane for a desired application.

In embodiments, the first MOF formed may have a crystal size of about 10 nm to about 10 μm. In an embodiment, the first MOF may have a thickness of 100 nm to about 50 μm. With the benefit of this disclosure, one of ordinary skill in the art will be able to construct a first MOF membrane with the desired crystal size and thickness for a desired application.

Detailed techniques and examples of using the counter-diffusion method are described below and in International Patent Application Serial No. PCT/US13/066221 filed on Oct. 22, 2013, the disclosure of which is incorporated herein in its entirety. As discussed above, the counter-diffusion method comprises soaking the support in the metal and solvent solution or the ligand and solvent solution. In embodiments, the support is soaked for a suitable time to fully saturate the pores inside the support with the metal solution. As an example, a support may be soaked in a metal and solvent solution comprising $ZnCl_2$ dissolved in methanol. In an embodiment, the rapid thermal deposition method (counter-diffusion method) includes solvothermally (or hydrothermally) treating the support saturated with the metal solution in a corresponding ligand and solvent or metal and solvent solution to provide crystallization, thereby producing a metal-organic framework membranes formed on the support. In the counter diffusion method, the solvent does not evaporate (i.e. evaporation is impossible). Instead, the support is sealed in a reactor vessel (e.g. an acid-digestion vessel) under pressure. In the counter diffusion method, a catalyst may be added (amongst other reasons) to increase the reaction rate so as to allow a sufficient membrane to be formed in the reaction zone, prior to the ligand and/or metal diffusing away from the support. The temperature may range from about ambient temperature to about 200° C. It is to be understood that the first MOF membrane may be created in any fashion, and the embodiments disclosed herein allow for the creation of a second MOF membrane on the surface of a first MOF membrane that was created in any fashion. As such, the second MOF membrane and method of producing the second MOF membrane is not limited or restricted in any manner by the method of producing the first MOF membrane.

FIG. 1 illustrates a counter-diffusion technique. In FIG. 1, a support 5 that is metal saturated is lowered into a ligand and solvent solution 10. The contra-diffusion reaction starts in the reaction zone 35 of the support 5 that is metal saturated, as the metal diffuses out of the interior of the support 5 and the ligand from the ligand and solvent solution 10 diffuses into the support 5. A first MOF membrane 30 forms in the reaction zone 35 that comprises the ligand and the metal from the support 5.

Once a first MOF membrane is created, an ultra-thin second MOF membrane may be constructed at the outermost surface of the first MOF membrane. This process utilizes ligand and/or metal exchange reactions. In embodiments, the ligand and/or metal exchange reaction is initiated by placing the first MOF membrane into a ligand and solvent solution, a metal and solvent solution, or a ligand and metal solvent solution, depending on which components: ligand and/or metal are desired for exchange.

In embodiments, any of the MOFs described above that are suitable for the first MOF are also suitable for the second MOF. In embodiments, the second MOF is isostructural with the first MOF.

The description of the ligand and solvent solutions and the metal and solvent solutions used to construct the second MOF membrane is exactly the same (e.g. same grouping of solvents, ligands, metals, catalysts, ratio of components, etc.) as the ligand and solvent solutions and the metal and solvent solutions described above for the construction of the first MOF membrane. However, in embodiments, the solutions comprise different ligands for a ligand exchange reaction, different metals for a metal exchange reaction, and different ligands and metals for a ligand and metal exchange reaction than the ligands and/or metals used to construct the first MOF membrane. For example, in embodiments comprising a ligand exchange reaction, if a ligand and solvent solution comprising the ligand imidazole-2-carboxaldehyde was used to create the first MOF membrane, the ligand and solvent solution used to create the second MOF membrane would not comprise the ligand imidazole-2-carboxaldehyde, but instead would comprise a different ligand, e.g., 2-methylimidazole. As another example, in embodiments comprising a metal exchange reaction wherein it is desired to construct a second MOF comprising a different metal than that of the first MOF, if a metal and solvent solution comprising the metal cobalt was used to create the first MOF membrane, the metal and solvent solution used to create the second MOF membrane would not comprise the metal cobalt, but instead would comprise a different metal, e.g., zinc. Finally, and unlike the solutions used for the creation of the first MOF membrane, a ligand and metal solvent solution may be used to exchange both the ligand and metal of the first MOF in the creation of the second MOF. Such a solution will be referred to as a "precursor solution" because said solution contains both precursor materials used to create the second MOF. In embodiments comprising both a ligand and metal exchange reaction, the surface of the first MOF membrane will exchange both ligand and metal groups to create an ultra-thin second MOF membrane on its surface that comprises different ligands and metals than that of the first MOF membrane. In embodiments, when constructing the second MOF membrane, the ligand and solvent solution, the metal and solvent solution, or the precursor solution may comprise a single species of ligand, metal, or ligand and metal respectively. Alternatively, when constructing the second MOF membrane, the ligand and solvent solution, the metal and solvent solution, or the precursor solution may comprise multiple species of ligands, metals, or ligands and metals respectively, as such, the multiple species of ligands and/or metals may react simultaneously to construct the second MOF membrane as desired.

The exchange reactions described above create an ultra-thin second MOF on the surface of the first MOF by exchanging the ligands and/or metals of the surface unit cells of the first MOF. Without being limited by theory, this process does not induce the formation of new crystals, but instead merely replaces the ligands and/or metals of the uppermost portion of the unit cells of the first MOF to create a new ultra-thin MOF. These exchange reactions therefore allow for the creation of a new MOF that is isostructural to the first yet comprises an altered pore size. The altered pore size of the second MOF may be larger or smaller than the pore size of the first MOF. Generally, larger pore sizes would be expected to increase permeability, conversely smaller pore sizes may increase selectivity. Without limitation, creating MOF membranes with the right mix of permeability and selectivity is important for applications such as gas selectivity.

Figure 2:
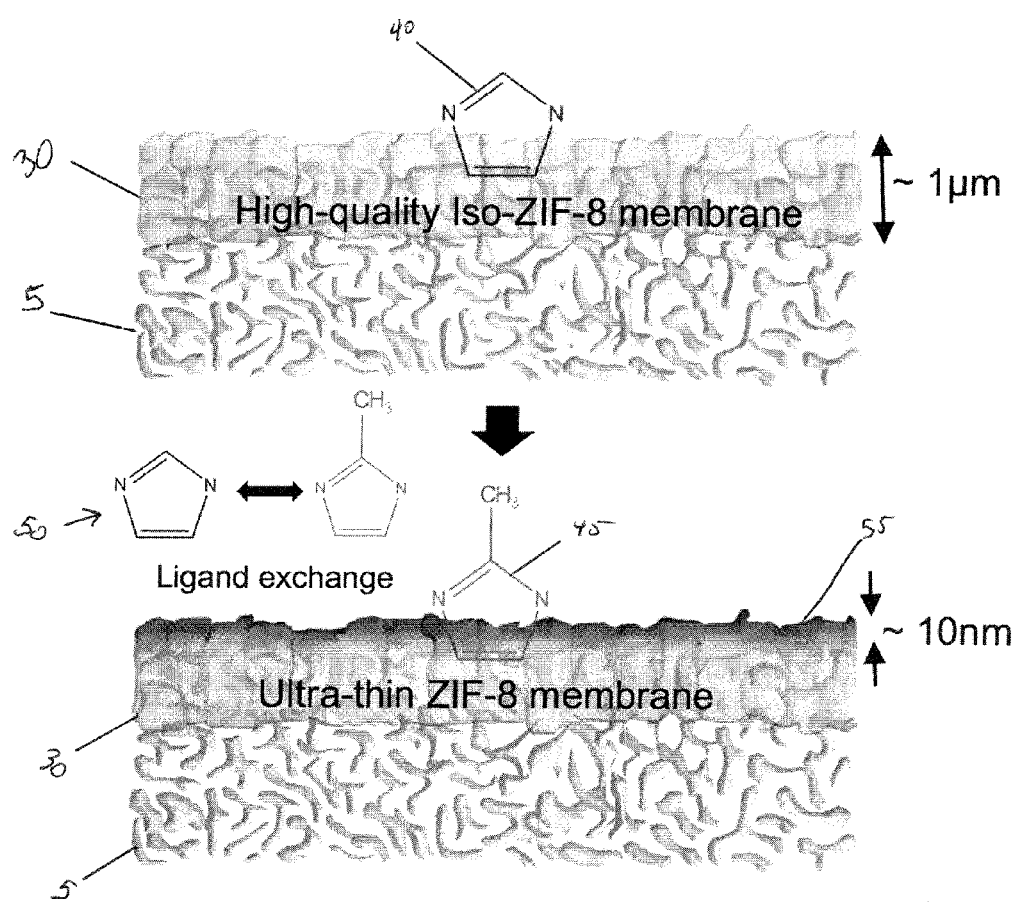
FIG. 2 illustrates a ligand exchange reaction in accordance with certain embodiments.

FIG. 2 illustrates an example of the ligand exchange reaction described above. First MOF membrane 30 has been formed via a counter diffusion method on support 5 (see FIG. 1 for a description). Imidazole 40 of an isostructural ZIF-8 membrane is exchanged for 2-methylimidazolate 45 via a controlled ligand exchange reaction 50 to form a second MOF membrane 55. Since the ligand exchange reaction 50 is tightly controlled, the width of the second MF membrane is significantly thinner than that of the first MOF membrane. Furthermore, the ligand exchange reaction produces a second MOF membrane with a pore size that is different from that of the first MOF membrane. This alteration of pore size may create a second MOF membrane with either increased permeability or increased selectivity, dependent upon whether the second MOF membrane pore size has decreased or increased relative to the first MOF membrane pore size. For example, a first ZIF-8 membrane comprising a pore size greater than 4.1 angstroms may undergo ligand exchange to produce a second ZIF-8 membrane comprising a pore size between 4.0 and 4.1 angstroms. Decreasing the pore size decreases permeability but increases selectivity. For example, in hydrocarbon gas separation applications, a pore size greater than 4.1 angstroms may not comprise any selectivity between propane and propylene; however, a pore size between 4.0 and 4.1 angstroms may possess selectivity between propane and propylene. Therefore, in the example described above, the first ZIF-8 membrane may be more permeable to both propane and propylene but not selective towards either, whereas the second ZIF-8 membrane may be overall less permeable to propane and therefore possess a selectivity towards propane/propylene that is not present in the first ZIF-8 membrane. The above process and result may be similar for metal exchange and ligand/metal exchange reactions.

Although the methods described herein are couched in terms of a bilayer of a first MOF and a second MOF, those of ordinary skill in the art will recognize and appreciate that the methods described herein may also be used to create a third MOF on the surface of the second MOF, a fourth MOF on the surface of the third MOF, and so forth. Thus, the methods described herein may also be used to create trilayers, quadlayers, etc. of isostructural membranes, with each subsequent layer possessing different ligands and/or metals than the layer on which it is constructed. As such, the methods described herein may be used to create multilayered MOF membranes with varying pore sizes, thicknesses, and compositions, which may be used in various applications as described herein.

In embodiments, the first MOF membrane may possess a larger pore size than the second MOF membrane. Alternatively, the first MOF membrane may possess a smaller pore size than the second membrane. Therefore, the relationship between the pore sizes of first and second MOFs is irrelevant, and the second MOF membrane may possess a pore size larger or smaller than the corresponding first MOF membrane. The pore sizes are dependent entirely upon which metal and ligands were used to produce the first MOF and the second MOF. In embodiments, factors for consideration in choosing which ligands/metals to use for the second MOF membrane include whether the ligand/metal exchange reaction will produce a second MOF membrane with the desired pore size relative to the first MOF membrane, and whether the second MOF membrane will not alter the crystal structure of the underlying first MOF membrane but remain isostructural to it.

In embodiments, the second MOF membrane may possess a thickness of less than about 500 nm. Therefore, the thickness of the second MOF membrane may be about 500 nm, about 250 nm, about 100 nm, about 50 nm, about 10 nm, or less. With the benefit of this disclosure, one of ordinary skill in the art will be able to prepare a second MOF membrane having a suitable thickness for an application.

In embodiments, the ligand and/or metal exchange reaction is controlled such that the rate of reaction proceeds only as allowed. This is accomplished by making the ligand and/or metal exchange reaction a diffusion limited process. For example, given a fixed time for the reaction, the concentration of the ligand and/or metals in the ligand and solvent, metal and solvent, or precursor solutions may be decreased such that only the uppermost surface of the unit cells of the first MOF membrane are exchanged. Alternatively, given a fixed concentration of reactants, the time may be limited so that there is only enough time for the uppermost surface of the unit cells of the first MOF membrane to be exchanged. Likewise, temperature may be controlled.

Temperature and the reaction rate exist in a direct relationship, such that lowering the temperature may lower the reaction rate and thus potentially limit the ligand/metal exchange reaction to only the uppermost surface of the unit cells of the first MOF membrane. The specific reaction conditions for a ligand and/or metal exchange reaction vary with the ligand(s) and/or metal(s) chosen as reactants. For example, when a first membrane is ZIF-8 and an exchanging ligand is imidazole-2-carboxaldehyde, the temperature and time to reach 25% ligand exchange of a first membrane may be around 60° C. and 48 hours. The reaction process may be tailored to provide higher exchange rates or lower exchange rates as desired. With the benefit of this disclosure, one of ordinary skill in the art will be readily able to determine the proper reaction conditions for a specific ligand and/or metal exchange reaction.

In embodiments, since the disclosed methods conserve metal and/or ligand reagents and use less metal and ligand reagents than currently known methods; the metal and solvent solution and/or the ligand and solvent solution may be recycled as the solutions may comprise sufficient reagent to maintain sufficient reactivity for additional uses. In embodiments, this recycling may comprise reuse of the metal and solvent solution and/or the ligand and solvent solution, or it may comprise combining the used metal and solvent solution and/or the ligand and solvent solution with another metal and solvent solution and/or ligand and solvent solution.

In embodiments, the ligands of the second MOF membrane may undergo post-synthetic modification. For example, 2-methyl imidazolate of the first MOF membrane may be exchanged with imidazole-2-carboxaldehyde. The aldehyde functional group of imidazole-2-carboxaldehyde may then react with an amine functional group by condensation reaction. The amine functional group may further comprise polar functional groups such as hydroxyl and carboxyl groups, creating a polar membrane surface that may be used to increase selectivity, e.g., propylene with weak polarity might be favored over non-polar propane.

In some embodiments, and as discussed above, the first MOF and the second MOF may form a selectively permeable membrane which may allow for the isolation of a specific gas. Thus, the above described method allows for the separation of and consequently, the selection of gases. Gases which may be selected by this method include, but are not limited to such as $H_2$, $CO_2$, $N_2$, $CH_4$, $SF_6$, $C_3H_6$, $C_3H_8$, $C_2H_4$, $C_2H_6$, n-$C_4H_{10}$, i-$C_4H_{10}$, and the like. The gases may be selected for and isolated from mixtures of any gas (e.g., selecting $C_2H_4$ from a mixture of $C_2H_4$ and $C_2H_6$, or selecting $CO_2$ from air). As described above, the mixtures of any gas may include species of gases disclosed herein, or may include mixtures of species of gases disclosed herein, or may include any such gases or mixtures of gases whether or not said gases or mixtures of gases are disclosed herein.

Although the present invention and its advantages have been described in detail, it should be understood that various changes, substitutions and alterations may be made herein without departing from the spirit and scope of the invention as defined by the appended claims.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the invention. If there is any conflict in the usages of a word or term in this specification and one or more patent(s) or other documents that may be incorporated herein by reference, the definitions that are consistent with this specification should be adopted.

What is claimed is:

1. A method for producing a second metal-organic framework on a surface of a first metal-organic framework comprising:
    (A) contacting the first metal-organic framework with a ligand and solvent solution; wherein the first metal-organic framework comprises a first ligand and a first metal; wherein the ligand and solvent solution comprises a second ligand that is different from the first ligand in the first metal-organic framework; and
    (B) allowing the second ligand from the ligand and solvent solution to exchange with the first ligand present in the first metal-organic framework for a period of time suitable to produce the second metal-organic framework on the surface of the first metal-organic framework.

2. The method of claim 1, wherein the second ligand in the ligand and solvent solution comprises an imidazole, a carboxylic acid, or any combinations thereof.

3. The method of claim 1, wherein the ligand and solvent solution further comprises a catalyst, wherein the catalyst comprises an amine, an organic base, an inorganic base, or any combinations thereof.

4. The method of claim 1, wherein the solvent comprises water, an alcohol, dimethylformamide, dimethyl sulfoxide, or any combinations thereof.

5. The method of claim 1, wherein a pore size of the second metal-organic framework is different from a pore size of the first metal-organic framework.

6. The method of claim 1, further comprising isolating a gas from a mixture of gases, wherein the gas comprises $H_2$, $CO_2$, $N_2$, $CH_4$, $SF_6$, $C_3H_6$, $C_3H_8$, $C_2H_4$, $C_2H_6$, n-$C_4H_{10}$, i-$C_4H_{10}$, or any combinations thereof; wherein the isolating the gas is accomplished by a selectively permeable membrane formed from the first metal-organic framework and the second metal-organic framework.

7. The method of claim 1, wherein the ligand and solvent solution further comprises a second metal, wherein the second metal comprises iron, copper, zinc, cobalt, aluminum, zirconium, vanadium, chromium, manganese, or any combinations thereof.

* * * * *